US007953890B1

(12) United States Patent
Katkar et al.

(10) Patent No.: US 7,953,890 B1
(45) Date of Patent: May 31, 2011

(54) SYSTEM AND METHOD FOR SWITCHING TO A NEW COORDINATOR RESOURCE

(75) Inventors: Amol S. Katkar, Pune (IN); Grace Jing Chen, Sunnyvale, CA (US); Viraj R. Kamat, Pune (IN); Shardul Divatia, Fremont, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1501 days.

(21) Appl. No.: 11/341,301

(22) Filed: Jan. 27, 2006

(51) Int. Cl.
*G06F 15/16* (2006.01)
(52) U.S. Cl. ......... 709/245; 709/219; 709/223; 709/226
(58) Field of Classification Search .................. 709/208, 709/245, 219, 223, 226
See application file for complete search history.

(56) References Cited

U.S. PATENT DOCUMENTS

| 6,449,641 | B1* | 9/2002 | Moiin et al. | 709/220 |
|---|---|---|---|---|
| 6,636,982 | B1* | 10/2003 | Rowlands | 714/4 |
| 7,120,693 | B2* | 10/2006 | Chang et al. | 709/227 |
| 7,464,378 | B1* | 12/2008 | Limaye et al. | 718/100 |
| 7,606,986 | B1* | 10/2009 | Limaye et al. | 711/153 |
| 2001/0056461 | A1* | 12/2001 | Kampe et al. | 709/201 |
| 2002/0042693 | A1* | 4/2002 | Kampe et al. | 702/186 |
| 2002/0095470 | A1 | 7/2002 | Cochran et al. | 709/208 |
| 2002/0124169 | A1* | 9/2002 | Agrawal et al. | 713/168 |
| 2002/0169861 | A1* | 11/2002 | Chang et al. | 709/223 |
| 2003/0028514 | A1* | 2/2003 | Lord et al. | 707/1 |
| 2003/0041138 | A1* | 2/2003 | Kampe et al. | 709/223 |
| 2003/0149735 | A1* | 8/2003 | Stark et al. | 709/208 |
| 2003/0154238 | A1* | 8/2003 | Murphy et al. | 709/201 |
| 2003/0177411 | A1* | 9/2003 | Dinker et al. | 714/13 |
| 2003/0187927 | A1* | 10/2003 | Winchell | 709/204 |
| 2004/0153711 | A1* | 8/2004 | Brunelle et al. | 714/4 |
| 2004/0205148 | A1* | 10/2004 | Bae et al. | 709/213 |
| 2006/0168192 | A1* | 7/2006 | Sharma et al. | 709/224 |
| 2006/0259619 | A1* | 11/2006 | Chang et al. | 709/224 |

FOREIGN PATENT DOCUMENTS

WO WO03096190 * 11/2003
WO WO 03096190 A1 * 11/2003

OTHER PUBLICATIONS

Georgiev et al. An Information-Interconnectivity-Based Retrieval Method for Network Attached Storage. Conference On Computing Frontiers. Proceedings of the 1st conference on Computing frontiers., Ischia, Italy ACM Special Interest Group on Microarchitectural Research and Processing, 2004.*
Sun Microsystems, *Campus Clusters Based on Sun Cluster Software*, Prentice Hall PTR, Feb. 14, 2003, pp. 1-16.
Sun Microsystems, *Sun Cluster Concepts Guide for Solaris OS: Chapter 3 Key Concepts—Administration and Application Development, Quorum and Quorum Devices*, Sep. 2004, pp. 1-9.

* cited by examiner

*Primary Examiner* — Quang N. Nguyen
*Assistant Examiner* — Kostas Katsikis
(74) *Attorney, Agent, or Firm* — Campbell Stephenson LLP (57) ABSTRACT

Various embodiments of methods and systems for dynamically switching to a new coordinator resource are disclosed. In one embodiment, a method involves receiving information identifying a new coordinator resource for use by a cluster; detecting whether each of the nodes within the cluster is committing to use the new coordinator resource; and switching from an existing coordinator resource to the new coordinator resource, in response to detecting that each of the nodes within the cluster is committing to use the new coordinator resource. This method can be performed concurrently with normal cluster operations, and thus the cluster need not be disabled to perform the switchover.

22 Claims, 4 Drawing Sheets

SYSTEM AND METHOD FOR SWITCHING TO A NEW COORDINATOR RESOURCE

FIELD OF THE INVENTION

This invention relates to computing systems and, more particularly, to clustered computing systems.

DESCRIPTION OF THE RELATED ART

A cluster is a distributed computer system that works together as a single entity to cooperatively provide processing power and mass storage resources. In a cluster, the processing load of the computer system is typically spread over more than one node (i.e., computing device), thereby eliminating single points of failure. Clusters can provide increased availability and/or load balancing. For example, availability is increased because programs executing on the cluster can continue to function despite a problem with one node within the cluster. While each node in a cluster typically executes an independent instance of an operating system, additional clustering software is executed on each node to facilitate communication and desired cluster behavior.

Clusters usually include resources that are shared between several of the nodes. The most common shared resource in a cluster is some form of shared data resource, such as one or more storage devices. Using a shared data resource gives different nodes in the cluster access to the same data, a feature that is critical for most clustered applications. Although a storage device is perhaps the most common example of both a shared resource and a shared data resource, a variety of other types of shared devices (e.g., SAN (Storage Area Network) switches) can also be implemented.

Nodes within a cluster can be connected to each other and/or to clients by a network (e.g., a local area network (LAN) or wide area network (WAN) such as the Internet). The cluster nodes communicate with each other in order to coordinate their activities (e.g., to coordinate the migration of a service from one node to another during cluster maintenance, to coordinate updates to cluster membership information when nodes enter or leave the cluster, and the like). Nodes also communicate with each other in order to detect whether one of the nodes has failed. For example, nodes can exchange 'heartbeat' messages, which indicate that each node is currently available to the cluster and functioning properly. Often, this cluster-specific communication is implemented using a private network that links the cluster nodes (as opposed to using the same network that is also used to communicate with clients). If the failure of a node is detected (e.g., due to that node failing to send a heartbeat message within a given interval), the application services provided by that node may be relocated to another node.

If communication between cluster nodes is disrupted, a cluster can effectively be partitioned into two or more sub-clusters. Such a communication disruption can arise for a variety of reasons, including failure of a device within the communication network itself and an excessive processing load on one node interfering with that node's ability to send heartbeat messages. As a result of the communication disruption, a node can communicate with nodes in the same sub-cluster but cannot communicate with nodes in other sub-clusters. Accordingly, the node may erroneously determine that a node in another sub-cluster is no longer present in the cluster or functioning properly, and vice versa. If these two nodes provide the same service within the cluster, there is a possibility that both will assume that the other has failed, and that each node will consequently assume that it has exclusive access to a shared resource (e.g., a storage volume) used to provide that service. If both nodes modify the shared resource, a 'split-brain' situation may result. Such a split-brain situation arises when two nodes, each unaware of the other, both use a shared resource (e.g., both may be executing the same application and consequentially modifying data in a shared storage device) and cause data corruption or otherwise inconsistent cluster operation to occur.

In order to prevent split-brain situations, clustering software can be configured to shut down all but one sub-cluster upon detection of a cluster partition. Such clustering software determines whether a node has failed or whether that node is simply not communicating properly. If the latter case exists, a cluster partition has occurred and all but one of the resulting sub-clusters are shut down in order to prevent more than one of the sub-clusters from being able to access shared resources.

Often, a coordinator resource is used to handle potential split-brain scenarios. One example of a coordinator resource is a storage device to which all nodes have access. If a partition occurs, nodes in different sub-clusters "race" to gain the right to continue operating via the storage device (e.g., the first sub-cluster to gain write access to the storage device gains the right to continue operating). The first sub-cluster to gain the right to continue operating will survive the partition; the other sub-cluster(s) will not be able to access the coordinator resource and will consequentially cease cluster operations. In this manner, a split-brain scenario is avoided.

In certain situations, a coordinator resource may need to be replaced or repaired. For example, if the coordinator resource is implemented on a storage device, the coordinator resource may need to be removed in order to upgrade the storage device. If the cluster continues to operate and a network partition occurs while the coordinator resource is removed, the resulting sub-clusters will all shut down (since no sub-cluster can win the race for the coordinator resource in this situation) in order to prevent a split-brain scenario that might otherwise result. To prevent that possible scenario, the cluster has to be disabled before the coordinator resource can be removed. While split-brain conditions are undesirable, it is also undesirable to shut down the entire cluster. Therefore, new techniques are needed for safely replacing a coordinator resource without disabling the cluster.

SUMMARY

Various embodiments of methods and systems for dynamically switching to a new coordinator resource are disclosed. In one embodiment, a method involves receiving information identifying a new coordinator resource for use by a cluster; detecting whether each of the nodes within the cluster is committing to use the new coordinator resource; and switching from an existing coordinator resource to the new coordinator resource, in response to detecting that each of the nodes within the cluster is committing to use the new coordinator resource. This method can be performed concurrently with normal cluster operations, and thus the cluster need not be disabled to perform the switchover.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
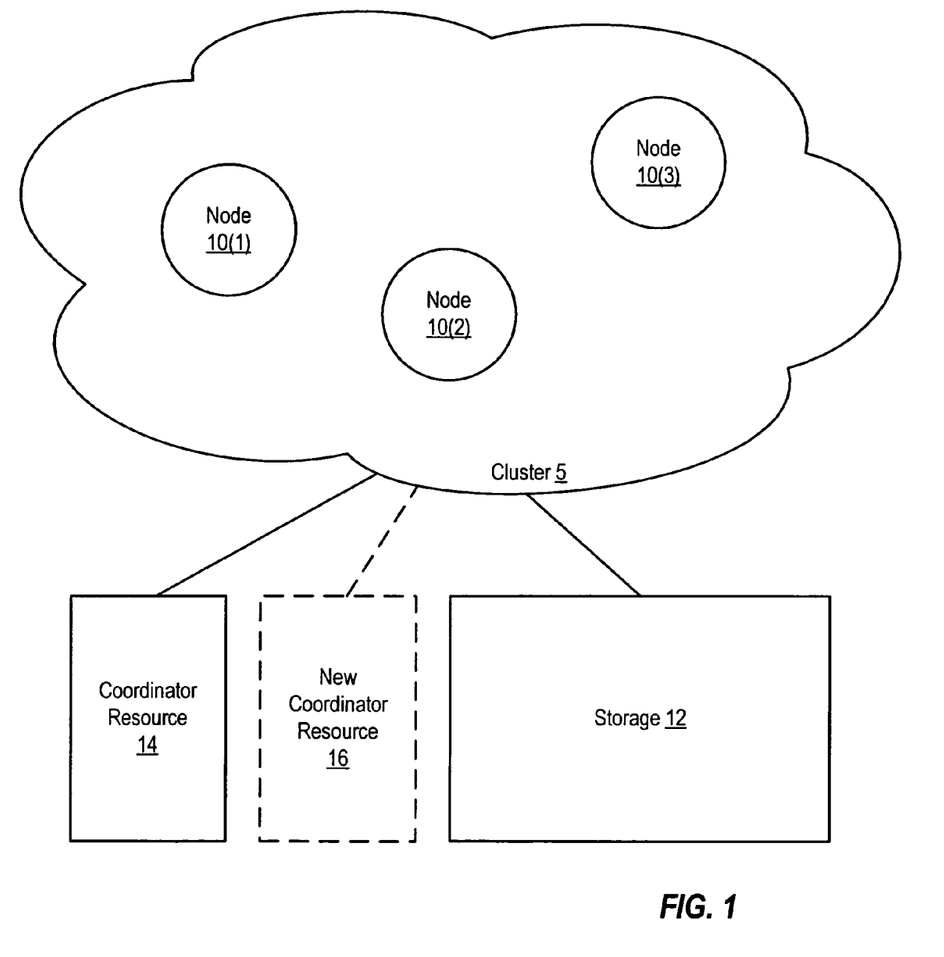
FIG. 1 is a block diagram of a cluster, according to one embodiment of the present invention.

FIG. 1 is a block diagram of a cluster 5 that includes several nodes, each of which is configured to execute one or more clustered applications. As shown, cluster 5 includes three nodes 10(1)-10(3) (collectively, nodes 10). Each node can include a computing device, such as a personal computer, server, cell phone, or other device. In some embodiments, several nodes can be implemented in a single physical computing device. For example, a multiprocessor computer system may be subdivided into several virtual machines, each of which is used to implement a node in a cluster.

Nodes 10 are coupled to communicate with each other by one or more networks (not shown in FIG. 1). For example, nodes 10 can be coupled by one or more LANs and/or WANs. Such networks can also couple cluster 5 to one or more external clients (it is noted that in some situations, nodes within cluster 5 can also be clients of cluster 5). Additionally, nodes 10 can be coupled by one or more private networks. In some embodiments, private network(s) are used to communicate cluster-specific messages, such as heartbeat messages and messages effecting cluster membership and configuration updates, among the nodes.

One or more distributed applications can be executed on cluster 5. Distributed applications can include database management systems (DBMS), file servers, application servers, web servers, customer relationship management software, and the like. Each application, in conjunction with various other hardware (e.g., network interface cards and storage devices) and software resources (e.g., file systems, databases, and other applications), provides an application service to a client of cluster 5. The application and the hardware and software used by that application when providing the application service are collectively referred to as a service group. For example, a service group for a Web application can include disk groups on which Web pages are stored, a volume built in the disk group, a file system using the volume, a database whose table spaces are files and whose rows contain page pointers, network interface cards to export the Web service, one or more IP addresses associated with the network cards, the application program, and associated code libraries.

As another example, a service group that provides a database service can include database software, a network address (e.g., an IP (Internet Protocol) address), a file system, one or more logical storage volumes, and a set of physical storage devices. Some resources included in a given service group are duplicated on each node (e.g., all or part of an application can be loaded into memory in each node) that executes a particular application. Other resources, such as storage volumes, are shared between nodes that are configured to execute the same application.

A given service group can be online or offline (or in an intermediate state while transitioning between online and offline or vice versa) on a particular node. For example, if nodes 10(1)-10(3) are configured as a failover group for a particular application, the service group associated with application 12(3) can be online on node 10(1) and offline on nodes 10(2) and 10(3). If node 10(1) fails, the service group can be failed-over to node 10(3) by bringing that service group online on node 10(3). If nodes 10(1)-10(3) are configured as a parallel group, the same service group can be online on more than one node within cluster 5 concurrently.

In this example, nodes 10(1)-10(3) in cluster 5 are coupled to storage 12. Storage 12 can include an array of storage devices (e.g., a Redundant Array of Independent Disks (RAID) or just a bunch of disks (JBOD)) that store application data accessed by an application executing on cluster 5. Storage 12 can be organized into logical volumes accessible by application(s) executing on cluster 5. Nodes in cluster 5 can be coupled to storage 12 directly or via a network (e.g., a storage area network (SAN)).

Cluster 5 is also coupled to a coordinator resource 14. Coordinator resource 14 is a resource that is accessible from each node 10(1)-10(3). If a cluster partition occurs, cluster 5 may be subdivided into two or more sub-clusters that can no longer communicate with each other normally. In such a situation, at least one node in each sub-cluster will attempt to access coordinator resource 14 before resuming cluster operations. Coordinator resource 14 is usable to arbitrate between the sub-clusters in order to select a single sub-cluster. The selected sub-cluster can resume cluster operations; non-selected sub-clusters will cease cluster operations.

The use of a coordinator resource enables potential split-brain conditions to be resolved. If a cluster partition occurs, one node in each sub-cluster "races" to gain the right to continue operating from the coordinator resource. The winning node remains in the cluster, and losing nodes are "fenced off" from the shared data storage. Because these nodes do not gain control of the coordinator resource (e.g., by registering keys with a majority of the disks that make up the coordinator resource), the nodes remove themselves from the cluster. The ejected systems cannot write to the data disks and corrupt data. If a node realizes that it has been ejected, it removes itself from the cluster.

Coordinator resource 14 can be implemented using any resource that can be accessed by each node and that is also uniquely identifiable and usable to select one winner out of multiple sub-clusters that arise after a cluster partition. Examples of coordinator resources include storage devices, network switches (e.g., such as network switches used in a SAN), processes, non-cluster nodes, management consoles, and the like. It is noted that, if the coordinator resource is implemented in a storage device or set of storage devices, coordinator resource 14 can be implemented as part of storage 12.

When the coordinator resources are implemented from storage devices, nodes can use persistent resource registration and reservation commands when attempting to gain control of the coordinator resources. For example, in one embodiment, Small Computer System Interface version 3 (SCSI-3) persistent reservation and registration commands are used to register with SCSI-3 compliant disk drives that are used as coordinator resources. Such drives are separate from any shared data resources, e.g., data disks, and are typically not used for regular data.

Nodes 10(1)-10(3) are configured to dynamically switch from using an existing coordinator resource 14 to a new coordinator resource 16, without needing to cease performing cluster operations. Thus, the switchover from coordinator resource 14 to new coordinator resource 16 can be performed without shutting down cluster 5. In some embodiments, cluster operations are performed concurrently with the operations that are performed to effect the switchover.

The switchover is performed in such a way that either all nodes in cluster 5 will begin using new coordinator resource 16 or no nodes in cluster 5 will begin using new coordinator resource 16. In particular, before switching to new coordinator resource 16, the nodes exchange messages so that each node can determine whether each other node has committed to use the new coordinator resource. If any other node in cluster 5 has not committed to using new coordinator resource 16, none of the nodes in cluster 5 will perform the switchover. If instead all nodes have committed to using the new coordinator resource, all nodes will perform the switchover to the new coordinator resource. Examples of switchover processes are described below with respect to FIGS. 3 and 4.

Figure 2:
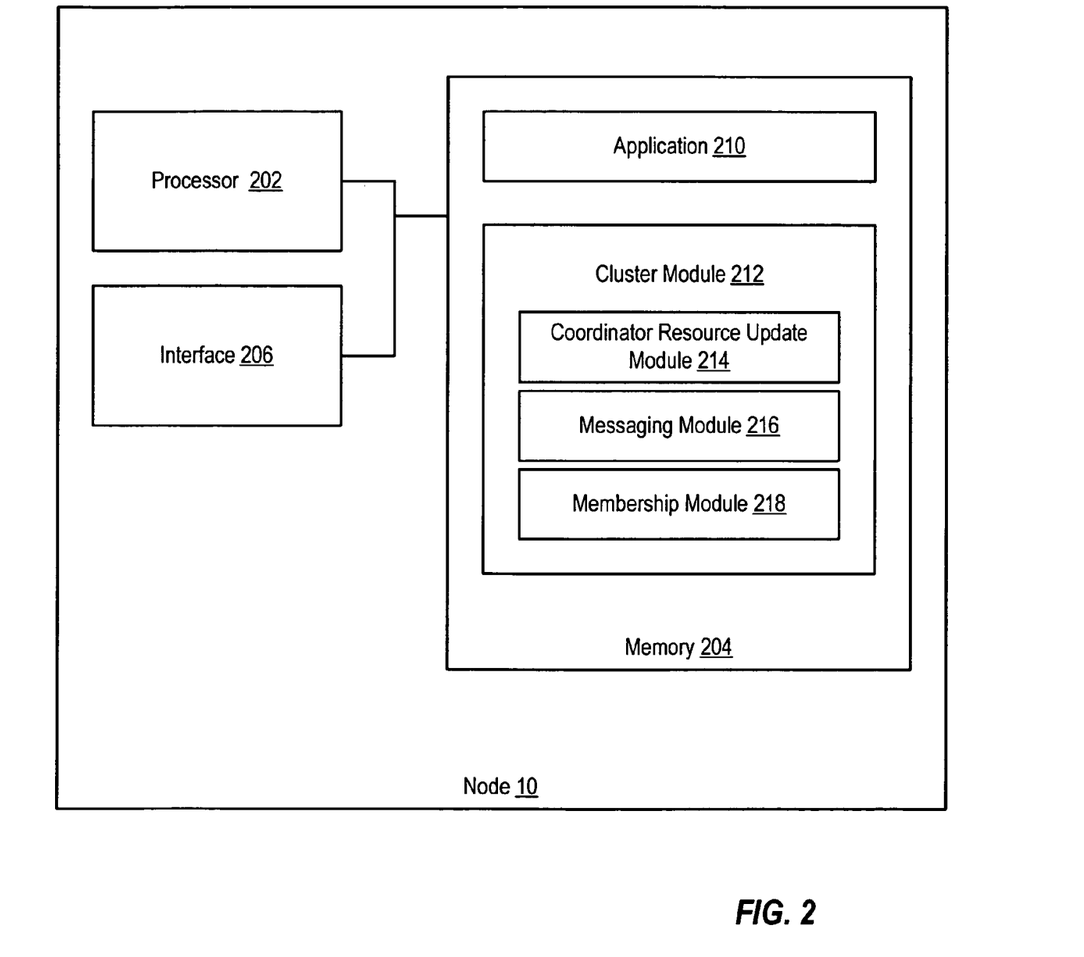
FIG. 2 is a block diagram of a node, according to one embodiment of the present invention.

FIG. 2 is a block diagram of a node 10 (e.g., one of nodes 10(1)-10(3) of FIG. 1) that can operate in a cluster (e.g., cluster 5 of FIG. 1). As shown, node 10 can be implemented as a computing device that includes at least one processor 202 (e.g., a microprocessor, PLD (Programmable Logic Device), or ASIC (Application Specific Integrated Circuit)) configured to execute program instructions stored in memory 204. Memory 204 can include various types of RAM (Random Access Memory), ROM (Read Only Memory), Flash memory, MEMS (Micro Electro-Mechanical Systems) memory, and the like. Node 10 also includes at least one interface 206. Processor 202, memory 204, and interface 206 are coupled to send and receive data and control signals by a bus or other interconnect.

Interface 206 can include an interface to a storage device on which user information for application 210 is stored. Interface 206 can also include an interface to a network for use in communicating with cluster clients and/or other client nodes. Interface 206 can also include interfaces to various input/output (I/O) devices, such as keyboards, mice, display devices, and the like.

Memory 204 can store all or part of the program instructions and data implementing a clustered application 210 as well as a cluster module 212. Cluster module 212 can manage the service groups (e.g., such as a service group that includes application 210) available at node 10. The cluster module can test a service group to ensure that it is providing the expected service to clients. The cluster module can also automatically start and stop a service group (e.g., to implement failovers within a failover group). The cluster module can also communicate messages with cluster modules on other nodes. For example, the cluster module can send and receive heartbeat messages that are used to determine which nodes are present in the cluster and functioning properly. The cluster module also maintains and monitors node membership in the cluster. In one embodiment, cluster module 212 is implemented by executing clustering software such as VERITAS Cluster Server™, available from Symantec Corporation of Cupertino, Calif.

As shown in FIG. 2, cluster module 212 includes a coordinator resource update module 214, a messaging module 216, and a membership module 218. Messaging module 216 is used to exchange messages with other cluster nodes. Such messages can include heartbeat messages as well as other messages that are exchanged in order to control the behavior of a cluster, such as the messages that are exchanged when the cluster is attempting to switchover to a new coordinator resource.

Membership module 218 is used to keep track of the current cluster membership. Based on messages received by messaging module 216, membership module 218 can update the cluster membership. Membership module 218 can also generate messages, to be sent by messaging module 216, that are sent to other nodes to indicate that node 10 is still present and functioning within the cluster. Membership module 218 can be used to detect cluster partitions.

Coordinator resource update module 214 participates in cluster activity in order to switch from an existing coordinator resource to a new coordinator resource. Coordinator resource update module 214 can send and receive messages related to the switchover via messaging module 216. If a cluster partition is detected by membership module 218 during certain stages of the switchover process, coordinator resource update module 214 can cause node 10 to cease cluster operations. It is noted that the functionality of coordinator resource 214 can be integrated with other modules within the cluster module 212 (e.g., such as a fencing module that actually responds to network partitions by racing for the coordinator resource).

Coordinator resource update module 214 is configured to receive a request to switch from an existing coordinator resource to a new coordinator resource. The request specifies the new coordinator resource. If each coordinator resource includes multiple resources (e.g., multiple disks, processes, switches, or the like), each resource that is to be part of the new coordinator resource is identified. The request can be generated by an administrator, who causes the list to be provided to each node. At node 10, the request can be received indirectly from another node (e.g., if a primary node is responsible for distributing such requests to secondary nodes, such as node 10) or directly from an administrator.

As an example, in one embodiment, the request is provided to coordinator resource update module 214 as a list of disks (the identified disks are the new coordinator resource). The list of disks can be generated automatically (e.g., by a script that is configured to select and identify disks suitable for use as coordinator resources) or manually (e.g., by an administrator who enters information, such as serial numbers, identifying the disks into a file). The list of disks can indicate that the disks are to be included in a disk group that is used as the coordinator resource. As an example, such a request can be generated by editing the disk group (as defined on each node within the cluster) that defines the coordinator resource to remove the disks included in the current coordinator resource and to add the disks included in the new coordinator resource. A node receiving such a request will maintain the information defining the old version of the disk group (so that the old version of the disk group can still be used as a coordinator resource) until the switchover is complete.

In some embodiments, the cluster itself generates the switchover request. For example, the cluster can be configured to detect a failure or error condition within the resource(s) currently being used as the coordinator resource and to responsively initiate a switchover to a new coordinator resource. In such an embodiment, one node within the cluster (e.g., a primary or master node) can be configured to generate a switchover request and to distribute that switchover request to the other nodes within the cluster.

It is noted that switchover requests are ultimately provided to each node within the cluster; however, there may be a significant amount of time during which some nodes have not received switchover requests. For example, consider a situation in which an administrator begins configuring the cluster to switchover to a new coordinator resource on Monday at 9 AM. The administrator manually creates a list of resources to be used as the new coordinator resource and begins providing this list to each node in the cluster. After configuring the first node (at 9 AM Monday) with the list, however, the administrator is distracted by another task. As a result, the administrator does not finish configuring all the nodes with the list until Tuesday at 4 PM. Between 9 AM Monday and 4 PM Tuesday, fewer than all of the nodes have received the switchover request (in the form of the list). The nodes in the cluster can be configured to wait until all nodes have received a switchover request before beginning the switchover process. Thus, no node will begin using the new coordinator resource before all nodes have received the switchover request.

In response to receiving a switchover request, coordinator resource update module 214 performs two functions: (1) the coordinator resource update module 214 verifies that node 10 can access the new coordinator resource and (2) the coordinator resource update module 214 verifies that each other node currently in the cluster has received a request to switch to the same new coordinator resource as node 10. These functions can be performed in any order.

Verifying that node 10 can access the new coordinator resource involves verifying that the node can perform the actions on the specified resource(s) that would be needed in the event of a cluster partition. For example, if the new coordinator resource is a disk group, coordinator resource update module 214 can verify that node 10 is able to read keys written to each disk in the disk group and also register keys corresponding to node 10 on each disk within the disk group. Thus, verifying that the node can access the new coordinator resource can test the connectivity between the node and the new coordinator resource as well as the functionality of node 10 and/or the new coordinator resource.

Verifying that each other node has received a request to switch the same new coordinator resource as node 10 can be performed in a centralized or distributed manner. For example, a distributed technique can involve each node in the cluster sending information identifying the device(s) that the sending node will use as the new coordinator resource to each other node. Each node then compares the list received from each other node to the node's own list. The verification process fails if any list differs from any other list.

Alternatively, this verification operation can be centralized. In such an embodiment, one node (e.g., a primary or master node) can be configured to perform the comparisons on behalf of the rest of the cluster. Thus, each node will send its list to the primary node, which will then compare lists received from all of the nodes (including the primary node). After comparing the lists, the primary node can send a message indicating the result of the comparison to each other node. A non-primary node performs this verification process by sending its list to the primary node and then waiting for the primary node to return the results of the comparison.

Coordinator resource update module 214 can send its version of the list to each other node (or to the primary node, if the comparison is centralized) as soon as node 10 receives its version of the list (as part of the switchover request). As noted above, nodes may receive lists at different times. Accordingly, each node configured to perform a comparison between lists received by different nodes can be configured to buffer lists until a list has been received from each node in the cluster (including the node performing the comparison).

It is noted that each node may identify the resource(s) to be used as the new coordinator resource differently (e.g., using a different name or other identifier). For example, each node may use a different naming convention when identifying the resources locally. In such situations, the nodes will include unique identifiers, which are usable at each other node, in the list for comparison purposes. For example, when sending a list of disks to each other node, coordinator resource update module 214 can include a serial number or world wide name for each of the disks in its list. Other nodes can use the serial number or world wide name to identify the disks, regardless of the fact that each node is using different local identifiers for the disks.

If the comparison indicates that all nodes are identifying the same resource(s), and if all nodes have successfully verified that the new coordinator resource is accessible, the switchover process will progress. Otherwise, the nodes will communicate a failure message (referred to herein as a "rollback" message) to each other. For example, if coordinator resource update module 214 determines that node 10 cannot access the new coordinator resource, coordinator resource update module 214 will cause node 10 to broadcast a rollback message to each other node. Once a rollback message is sent by any node, the switchover process should cease and all of the nodes will continue using the old coordinator resource. No node should switchover to the new coordinator resource in this situation. Thus, if coordinator resource update module 214 receives a rollback message (e.g., via messaging module 216) during the switchover process, coordinator resource update module 214 will cease attempting to switchover to the new coordinator resource.

Once the nodes have verified that all nodes are identifying the same resource(s) and each node has verified that the new coordinator resource is accessible, the switchover process is ready to enter a "commit" phase. In some embodiments, each node enters this process automatically upon successfully verifying that the new coordinator resource is locally accessible and successfully verifying that all cluster nodes are identifying the same resource(s). In other embodiments, this phase is manually triggered by an administrator (e.g., the administrator can review the verification processes performed at each node before configuring the nodes to progress to the commit phase).

During the commit phase, coordinator resource update module 214 sends a "commit" message. The commit message can either be broadcast to all other nodes (if this process is distributed) or sent to a primary node (if this process is centralized). The commit message includes information (such as a node ID) that identifies the sending node. Each node that receives commit messages waits until the number of commit messages equals the number of nodes in the cluster (the receiving node can also use the identification information in each commit message to verify that each message was sent by a different node). Once the receiving node has received a commit message from each node in the cluster (including itself), the receiving node can perform the switchover to the new coordinator resource. If commit messages are broadcast, each node can perform the switchover automatically upon receiving the requisite number of commit messages. If the commit messages are sent to a primary node, the primary node will send a message to each other node when the requisite number of commit messages has been received, and each other node can then perform the switchover. Thus, coordinator resource update module 214 can perform the switchover either in response to receiving a message from the primary node or in response to node 10 receiving the requisite number of commit messages from the other nodes in the cluster. The switchover is performed by updating information that identifies the coordinator resource.

After performing the switchover, coordinator resource update module 214 sends a "done" message. Again, this message can be broadcast to all other nodes or simply sent to a primary node. Once coordinator resource update module 214 verifies that all other nodes have sent a "done" message (either in response to receiving a "done" message from each node directly or in response to receiving a message from the primary node), coordinator resource update module 214 ends the switchover process.

There is a possibility that node 10 will detect a cluster partition (e.g., via cluster membership module 218) prior to completion of the switchover process (e.g., prior to all of the nodes in the cluster sending a "done" message) but after coordinator resource update module 214 has performed the switchover. In this situation, node 10 has begun using the new coordinator resource, but one or more other nodes in the cluster may still be using the old cluster resource. Accordingly, continued operation of node 10 in the presence of a cluster partition could lead to a "split brain" situation. As a result, if such a condition is detected, coordinator resource update module 214 is configured to cause node 10 to "panic," or cease cluster operations (e.g., by ending all processing steps, flushing its memory contents to disk, and stopping cluster communications).

It is noted that, in some situations, an administrator may find it useful to identify the old coordinator resource as the new coordinator resource in a switchover request. For example, the administrator can detect that activity (e.g., such as a firmware upgrade) has corrupted or erased registration keys stored on disks within the old coordinator resource. In order to cause all of the nodes in the cluster to re-register their keys with the coordinator disks.

The program instructions and data implementing cluster module 212 can be stored on various computer readable media such as memory 204. In some embodiments, such software is stored on a computer readable medium such as a CD (Compact Disc), DVD (Digital Versatile Disc), hard disk, optical disk, tape device, floppy disk, and the like). In order be executed by processor 202, the instructions and data implementing cluster module 212 are loaded into memory 204 from the other computer readable medium. The instructions and/or data can also be transferred to node 10 for storage in memory 204 via a network such as the Internet or upon a carrier medium.

Figure 3:
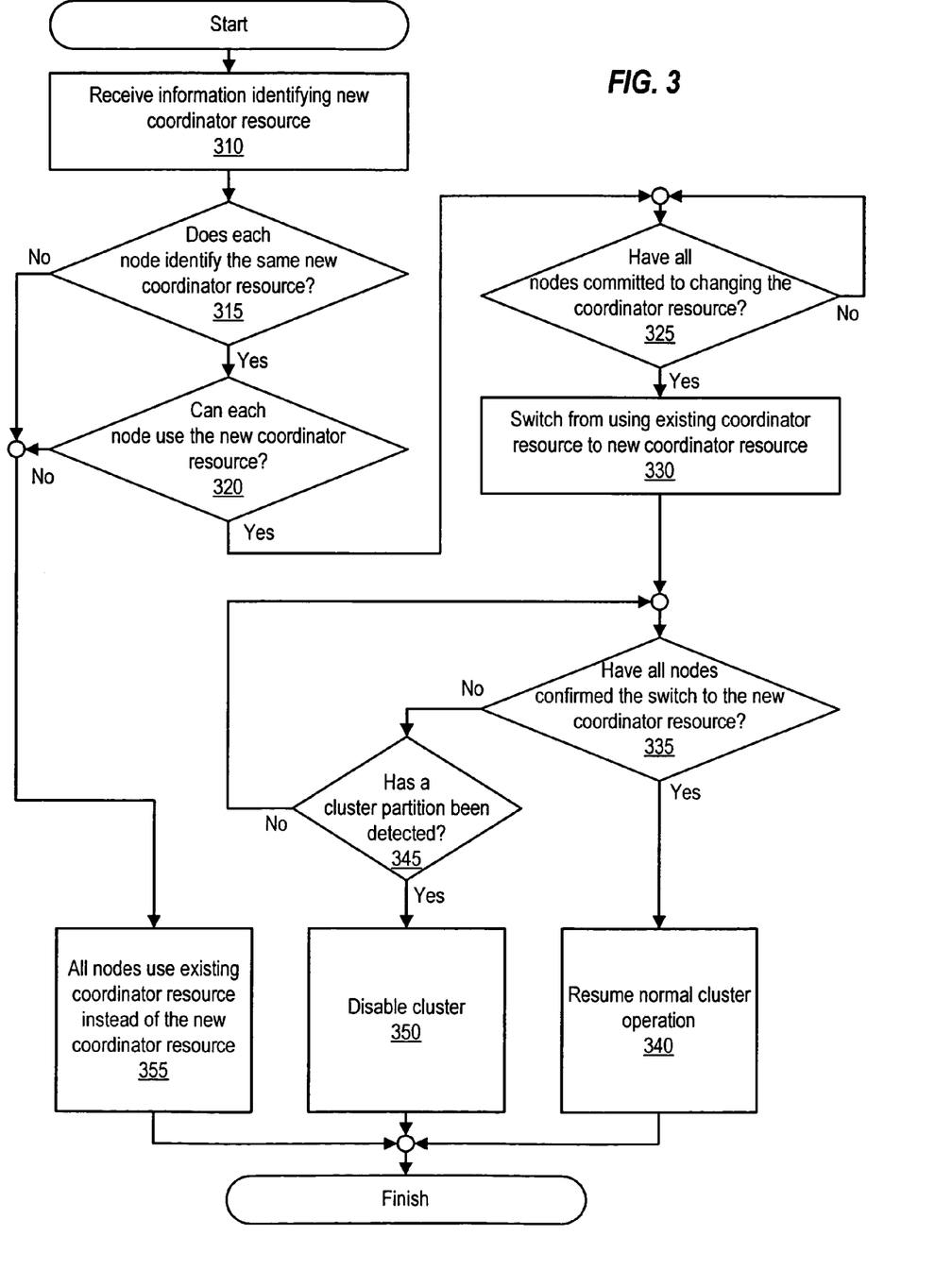
FIG. 3 is a flowchart of a method of updating a coordinator resource, according to one embodiment of the present invention.

FIG. 3 is a flowchart of a method of updating a coordinator resource. This method can be performed by a cluster module, such as cluster module 212 of FIG. 2, that includes a coordinator resource update module (e.g., such as coordinator resource update module 214 of FIG. 2) or implements corresponding functionality. It is noted that in some situations (e.g., in which certain functions are centralized in a primary node), performance of the method of FIG. 3 may involve multiple nodes (e.g., a primary node and a secondary node). The method begins at 310, when information identifying a new coordinator resource is received (e.g., an administrator can specify a new coordinator resource disk group).

In response to receiving the information identifying the new coordinator resource, a determination as to whether each node in the cluster is identifying the same new coordinator resource is made, as shown at 315. This determination is made by comparing information, received from all nodes in the cluster, identifying the new coordinator resource. This determination can either be made by each node in the cluster or by a primary node. For example, a primary node can compare a list of disks provided by each node (including the primary node) to each other. The primary node then sends the results of the determination to all non-primary nodes.

If each node identifies the same resource(s), the method progresses to determination 320. Otherwise, the method progresses to operation 355, where all nodes will end the switchover process and continue to use the existing coordinator resource instead of the new coordinator resource. One or more nodes can also generate an error message or indication as part of operation 355.

In determination 320, each node determines whether the new coordinator resource is usable as a coordinator resource. For example, each node can attempt to register a key with the coordinator resource as well as to read one or more keys from the coordinator resource. If each node can use the new coordinator resource, the method progresses to determination 325. Otherwise, the method progresses to operation 355.

In determination 325, a determination is made as to whether each node has committed to changing to the new coordinator resource. This determination can involve detecting whether commit messages have been sent by each node in the cluster. As with determination 315, determination 325 can be performed by each node or by a primary node. When all of the nodes have committed, the node switches from using the existing coordinator resource to the new coordinator resource 330.

At 335, a determination is made as to whether all nodes have confirmed the switch to the new coordinator resource. If so, the switchover process ends and normal cluster operations (i.e., in which cluster partitions are handled by racing for control of the coordinator resource) are resumed, as indicated at 340.

In the illustrated embodiment, there is no limit on the time needed to complete determinations 315, 320, 325 and 335. In such an embodiment, all nodes continue to use the existing coordinator resource (as opposed to the new coordinator resource) until determinations 315, 320, and 325 successfully complete. Thus, if a cluster partition happens while one of those determinations is waiting to complete, there is no need to cause any node to panic, since all nodes are still known to be using the same coordinator resource.

If a partition occurs while waiting for determination 335 to complete, however, one or more nodes should panic, since some nodes may be using different coordinator resources. Thus, if a cluster partition is detected at 345, cluster operations are disabled, as shown at 350.

It is noted that the operations shown in FIG. 3 can be performed in a different order than the order shown in FIG. 3. For example, determination 315 can be made concurrent with or subsequent to determination 320. It is noted that in alternative embodiments, determinations such as 315, 320, 325, and 335 can be time-limited (e.g., condition 325 can be considered to have failed if some nodes do not send commit messages within a timeout period).

Figure 4:
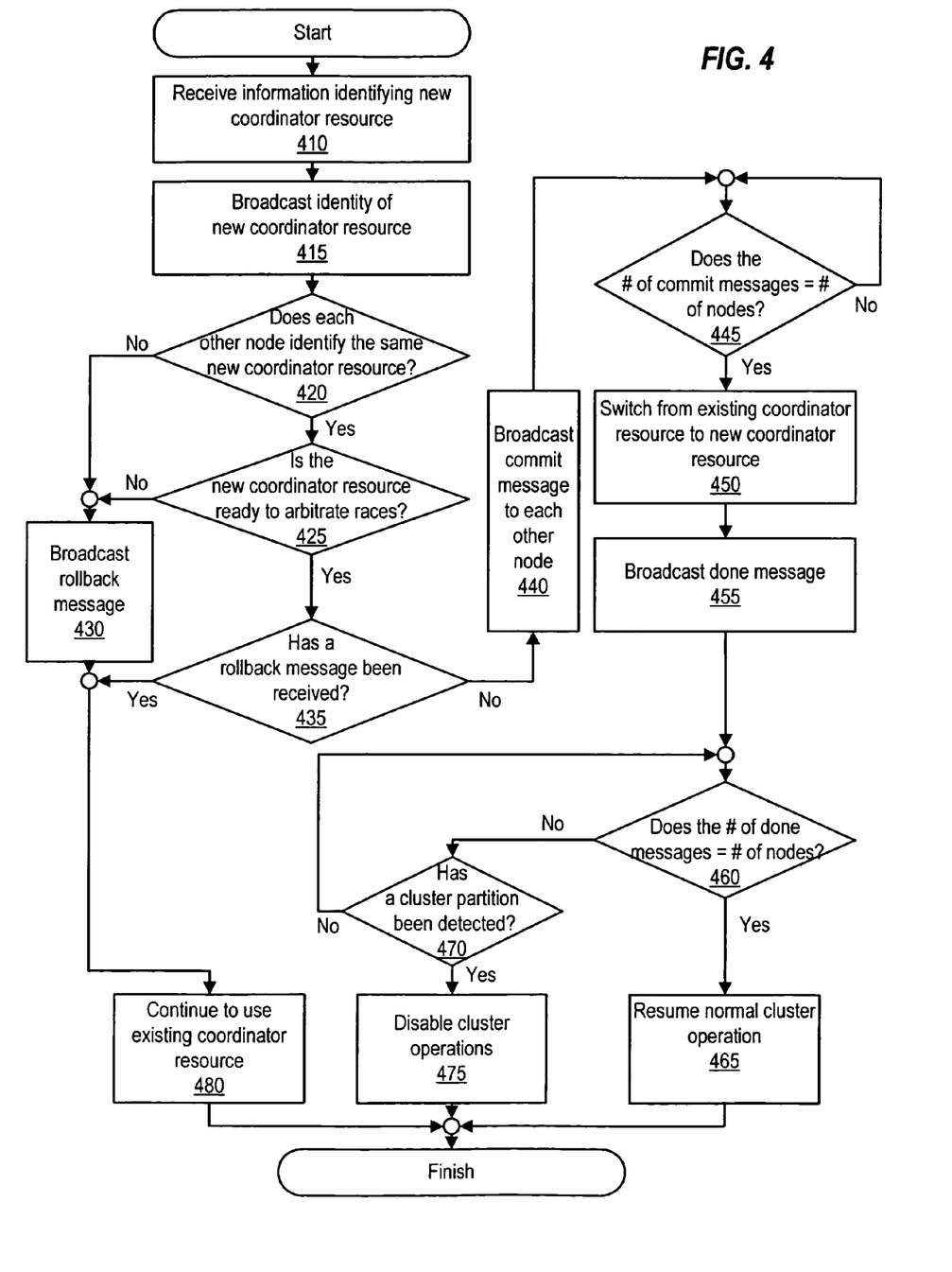
FIG. 4 is a flowchart of a method that can be performed by a node when updating a coordinator resource, according to one embodiment of the present invention.

FIG. 4 is a flowchart of a method that can be performed by a node when updating a coordinator resource. This method can be performed by a node such as node 10 of FIG. 2. In this example, determinations are distributed throughout the cluster, such that each node can perform the method of FIG. 4 independently, as opposed to being centralized in a primary node.

The method begins at 410 when information identifying a new coordinator resource is received. At 415, the node broadcasts the identity of the new coordinator resource (e.g., by broadcasting a list of disks) to each other node within the cluster. The identity information broadcast at 415 uses a unique identifier, usable by the other nodes within the cluster, to identify each resource within the new coordinator resource.

The node determines whether each other node is identifying the same new coordinator resource as the node, as shown at 420. For example, the node can receive a list of disks from each other node and, if all lists are the same (including the one being used by the node making the comparison), the node will determine that all nodes are identifying the same coordinator resource.

At 425, the node determines whether the new coordinator resource is ready to arbitrate races. The node can perform operation 425 by determining whether the coordinator resource is accessible and whether the node can perform any activities that would be needed to gain control of the coordinator resource in the event of a cluster partition. For example, if the coordinator resource is a group of one or more SCSI disks, the node can attempt to read and/or register keys with the disks using persistent registration and/or reservation commands.

If the node cannot access the new coordinator resource, or if the node determines that some nodes are identifying a different new coordinator resource, the node broadcasts a rollback message to each other node in the cluster, as shown at 430. If the node sends or receives a rollback message (at 430 or 435), the node will cease attempting to switchover to the new coordinator resource and will continue to use the existing coordinator resource, as shown at 480.

If the node completes determinations 420 and 425 and neither sends nor receives a rollback message, the node will broadcast a commit message to each other node, as shown at 440. The commit message includes the ID of the sending node. The node can also begin receiving commit messages from other nodes. If the number of commit messages equals the number of nodes in the cluster (and if each node in the cluster has sent a commit message), the node switches from the existing coordinator resource to the new coordinator resource, as shown at 445 and 450. The node then broadcasts a done message, as shown at 445.

If the node receives a done message from each other node in the cluster (e.g., as determined by comparing the number of received done messages to the number of nodes in the cluster at 460 and verifying that each node has sent a done message), the node resumes normal cluster operation, as shown at 465. If a cluster partition is detected before done messages have been received from all other nodes, the node will disable cluster operations, as shown at 470 and 475.

As in FIG. 3, the operations of FIG. 4 can be performed in a different order than the order shown. For example, determination 420 can be made concurrently with or subsequently to determinations 425 and/or 435. Additionally, it is noted that in alternative embodiments, determinations such as 420, 425, 445, and 460 can be time-limited (e.g., condition 445 can be considered to have failed if some nodes do not send commit messages within a timeout period).

While certain messaging techniques (e.g., such as broadcasting) have been used to describe how messages are sent between cluster nodes in the above description, it is noted that other messaging techniques can be used. For example, instead of sending a rollback message to all other nodes within the cluster, the sending node can send the rollback message to all nodes, including itself. As another, messages can be exchanged in a serial fashion (e.g., if nodes are connected in a ring or daisy chain topology) in some embodiments. Thus, a node sending a rollback message can send the message to a neighboring node, which would process and then forward the rollback message to its neighboring node, and so on, until the message has been sent to each node in the cluster.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving information identifying a new coordinator resource for use by a cluster, wherein
      the cluster is coupled to an existing coordinator resource,
      the cluster comprises a plurality of nodes, and
      one of the nodes of the plurality of nodes is a primary node;
   detecting whether each of the nodes within the cluster is committing to use the new coordinator resource, wherein
      the detecting comprises detecting whether each of the nodes of the cluster has received a switchover request, and
      the detecting is performed prior to switching from the existing coordinator resource to the new coordinator resource;
   detecting a cluster partition;
   switching from the existing coordinator resource to the new coordinator resource, in response to detecting that each of the nodes within the cluster is committing to use the new coordinator resource, wherein
      the new coordinator resource is configured to deny access by a first node of the plurality of nodes subsequent to the cluster partition; and
   ending cluster operations on the first node, if the first node has not received a done message from each of the other nodes in the cluster prior to detection of the cluster partition, wherein each done message indicates that a respective sending node is now using the new coordinator resource.

2. The method of claim 1, wherein cluster operations are performed concurrently with the receiving, the detecting, and the switching.

3. The method of claim 1, further comprising:
   detecting whether a second node can use the new coordinator resource; and
   sending a rollback message to at least one of the nodes within the cluster, in response to detecting that the second node cannot use the new coordinator resource, wherein the rollback message instructs the at least one of the nodes to use the existing coordinator resource instead of the new coordinator resource.

4. The method of claim 3, wherein the detecting whether the second node can use the new coordinator resource comprises attempting to register the second node with a set of coordinator storage devices.

5. The method of claim 1, wherein the existing coordinator resource and the new coordinator resource are a same coordinator resource.

6. The method of claim 1, wherein the detecting whether each of the nodes within the cluster is committing to use the new coordinator resource comprises:
   receiving a commit message at a second node from each other one of the nodes within the cluster.

7. The method of claim 1, further comprising:
sending a message identifying the new coordinator resource from a second node of the nodes to at least one of the nodes within the cluster.

8. The method of claim 7, further comprising:
comparing messages received from the nodes in the cluster to determine whether each node in the cluster is identifying a same resource as the second node is identifying.

9. The method of claim 7, further comprising:
sending a done message from the second node to at least one of the nodes in the cluster, in response to the second node switching from the existing coordinator resource to the new coordinator resource, wherein the done message indicates that the second node is now using the new coordinator resource.

10. A system comprising:
a first coordinator resource;
a second coordinator resource; and
a cluster comprising a plurality of nodes, wherein
the first coordinator resource is coupled to the cluster,
the cluster comprises a primary node,
the cluster is configured to:
detect, prior to switching from the first coordinator resource to the second coordinator resource, whether each of the plurality of nodes is committing to use the second coordinator resource, wherein
the cluster is further configured to detect whether each of the nodes of the cluster has received a switchover request;
detect a cluster partition;
switch from using the first coordinator resource to using the second coordinator resource without ending cluster operations, wherein
the second coordinator resource is configured to deny access by a first node of the plurality of nodes subsequent to the cluster partition; and
end cluster operations on the first node, if the first node has not received a done message from each of the other nodes in the cluster prior to detection of the cluster partition, wherein the done message indicates that a sending node is using the second coordinator resource.

11. The system of claim 10, wherein the cluster is configured to:
verify that each of the nodes can use the second coordinator resource; and
inhibit the switch from using the first coordinator resource to using the second coordinator resource unless each of the nodes can use the second coordinator resource.

12. The system of claim 10, wherein the cluster is configured to:
detect whether each of the nodes is committed to using the second coordinator resource; and
inhibit the switch from using the first coordinator resource to using the second coordinator resource unless each of the nodes has committed to use the second coordinator resource.

13. The system of claim 10, wherein the cluster is configured to:
detect whether each of the nodes identifies the second coordinator resource as a new coordinator resource; and
inhibit the switch from using the first coordinator resource to using the second coordinator resource unless each of the nodes identifies the second coordinator resource as the new coordinator resource.

14. The system of claim 10, wherein the second coordinator resource comprises one of: a set of one or more storage devices, a network switch, a process, a non-cluster node, and a management console.

15. A node comprising:
an interface configured to receive information identifying a new coordinator resource; and
a coordinator resource update module coupled to the interface and configured to:
receive information identifying a new coordinator resource for use by a cluster, wherein
the cluster comprises the node and an additional node,
the cluster comprises a primary node,
the cluster is coupled to an existing coordinator resource;
detect, prior to switching from the existing coordinator resource to the new coordinator resource, whether each of the nodes of the cluster is committing to use the new coordinator resource, wherein the coordinator resource update module is further configured to detect whether each of the nodes of the cluster has received
a switchover request;
detect a cluster partition; and
switch from the existing coordinator resource to the new coordinator resource, in response to detecting that each of the nodes of the cluster is committing to use the new coordinator resource, wherein
the new coordinator resource is configured to deny access by a first node of the plurality of nodes subsequent to the cluster partition;
end cluster operations on the first node, if the first node has not received a done message from each of the other nodes in the cluster prior to detection of the cluster partition, wherein the done message indicates that a sending node is now using the new coordinator resource.

16. The node of claim 15, wherein the coordinator resource update module is configured to:
detect whether the node can use the new coordinator resource; and
send a rollback message to the additional node, if the node cannot use the new coordinator resource,
wherein the rollback message instructs the at least one of the nodes to use the existing coordinator resource instead of the new coordinator resource.

17. The node of claim 16, wherein
the new coordinator resource comprises a storage device; and
the coordinator resource update module is configured to determine that the node can use the new coordinator resource if the node can register a key with the storage device.

18. The node of claim 15, wherein the existing coordinator resource is the new coordinator resource.

19. The node of claim 15, wherein the coordinator resource update module is configured to send a done message to the additional node, in response to switching from the existing coordinator resource to the new coordinator resource wherein the done message indicates that the node is now using the new coordinator resource.

20. A non-transitory computer readable storage medium comprising program instructions executable to:
receive information identifying a new coordinator resource for use by a cluster, wherein
the cluster is coupled to an existing coordinator resource, the cluster comprises a plurality of nodes, and
one of the nodes of the plurality of nodes is a primary node;
detect, prior to switching from the existing coordinator resource to the new coordinator resource, whether each of the nodes within the cluster is committing to use the new coordinator resource;
detect whether each of the nodes of the cluster has received a switchover request;
detect a cluster partition;
switch from the existing coordinator resource to the new coordinator resource, in response to detecting that each of the nodes within the cluster is committing to use the new coordinator resource, wherein
the new coordinator resource is configured to deny access by a first node of the plurality of nodes subsequent to the cluster partition; and
end cluster operations on the first node, if the first node has not received a done message from each of the other nodes in the cluster prior to detection of the cluster partition, wherein the done message indicates that a sending node is now using the new coordinator resource.

21. The non-transitory computer readable storage medium of claim 20, wherein the program instructions are further executable to:
determine whether a second node of the nodes can use the new coordinator resource; and
send a rollback message to at least one of the nodes within the cluster, in response to detecting that the second node cannot use the new coordinator resource.

22. The non-transitory computer readable storage medium of claim 20, wherein the existing coordinator resource is the new coordinator resource.

* * * * *